(12) United States Patent
Smith et al.

(10) Patent No.: US 7,401,144 B1
(45) Date of Patent: *Jul. 15, 2008

(54) TECHNICIAN INTRANET ACCESS VIA SYSTEMS INTERFACE TO LEGACY SYSTEMS

(75) Inventors: Steven G. Smith, Roswell, GA (US); Ralph J. Mills, Jr., Atlanta, GA (US); Roland T. Morton, Jr., Alpharetta, GA (US); Gary J. Dennis, Duluth, GA (US); Jeffrey A. Sylvester, Dallas, GA (US); Mitchell E. Davis, Palmetto, GA (US); Curt Kaloustian, Marietta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 700 days.

This patent is subject to a terminal disclaimer.

(21) Appl. No.: 09/892,736

(22) Filed: Jun. 28, 2001

(51) Int. Cl.
*G06F 15/173* (2006.01)
(52) U.S. Cl. .................. 709/225; 709/219; 709/223; 709/217; 709/238
(58) Field of Classification Search ............. 709/225, 709/246, 219, 217, 218; 707/10; 345/335
See application file for complete search history.

(56) References Cited

U.S. PATENT DOCUMENTS

| | | |
|---|---|---|
| 4,776,016 A | 10/1988 | Hanson |
| 4,905,163 A | 2/1990 | Garber et al. |
| 5,038,283 A | 8/1991 | Cavenay |

(Continued)

FOREIGN PATENT DOCUMENTS

EP 0 712 227 5/1996

(Continued)

OTHER PUBLICATIONS

Commercial Speech Recognition (www.tiac.net/users/rwilcox/speech.html).

(Continued)

*Primary Examiner*—Bunjob Jaroenchonwanit
*Assistant Examiner*—Dohm Chankong
(74) *Attorney, Agent, or Firm*—Withers & Keys, LLC (57) ABSTRACT

Methods and apparatus are disclosed for a technician to access an intranet through a systems interface to back-end legacy systems. Generally, a technician logs a computer into a systems interface that permits access to back-end legacy systems. Preferably, the systems interface is located on at least a first network address. Preferably, the systems interface includes a first server with middleware for managing the protocol interface. Preferably, the systems interface includes a second server for receiving requests and generating legacy transactions. After the computer is logged in, a request for access to an intranet is made. Preferably, the request results from the technician selecting an icon or engaging a software button. After the request is processed, a message is sent from the systems interface to the computer. The message causes the computer to launch a software application that seeks out a separate network address corresponding to the intranet. Preferably, the software application is a browser that seeks out a technician home page on the intranet. The systems interface routes communications from the computer to the separate network address. Preferably, the message cause the first server to route the computer from the first network address to the separate network address.

6 Claims, 4 Drawing Sheets

U.S. PATENT DOCUMENTS

| | | | |
|---|---|---|---|
| 5,359,649 A | 10/1994 | Rosu et al. | |
| 5,521,958 A | 5/1996 | Selig et al. | |
| 5,570,283 A | 10/1996 | Shoolery et al. | |
| 5,583,937 A | 12/1996 | Ullrich | |
| 5,623,404 A | 4/1997 | Collins et al. | |
| 5,664,110 A | 9/1997 | Green et al. | |
| 5,687,212 A | 11/1997 | Kinser, Jr. et al. | |
| 5,694,323 A | 12/1997 | Koropitzer et al. | |
| 5,696,906 A | 12/1997 | Peters | |
| 5,754,830 A | 5/1998 | Butts | |
| 5,799,279 A | 8/1998 | Gould | |
| 5,805,775 A | 9/1998 | Eberman | |
| 5,812,977 A | 9/1998 | Douglas | |
| 5,826,270 A | 10/1998 | Rutkowski | |
| 5,848,403 A | 12/1998 | Gabriner et al. | |
| 5,857,201 A | 1/1999 | Wright et al. | |
| 5,873,070 A | 2/1999 | Bunte | |
| 5,884,262 A | 3/1999 | Wise | |
| 5,884,266 A | 3/1999 | Dvorak | |
| 5,896,440 A | 4/1999 | Reed et al. | |
| 5,909,492 A | 6/1999 | Payne | |
| 5,915,001 A | 6/1999 | Uppaluru | |
| 5,920,846 A | 7/1999 | Storch et al. | |
| 5,923,735 A | 7/1999 | Swartz et al. | |
| 5,931,917 A | 8/1999 | Nguyen et al. | |
| 5,953,389 A | 9/1999 | Pruett | |
| 5,960,411 A | 9/1999 | Hartman et al. | |
| 5,963,940 A | 10/1999 | Liddy | |
| 5,970,472 A | 10/1999 | Allsop | |
| 5,974,135 A | 10/1999 | Breneman | |
| 6,023,683 A | 2/2000 | Johnson et al. | |
| 6,023,684 A | 2/2000 | Pearson | |
| 6,026,379 A | 2/2000 | Haller et al. | |
| 6,035,285 A | 3/2000 | Schlect | |
| 6,052,785 A * | 4/2000 | Lin et al. | 713/201 |
| 6,058,373 A | 5/2000 | Blinn | |
| 6,080,202 A | 6/2000 | Strickland | |
| 6,081,789 A | 6/2000 | Purcell et al. | |
| 6,092,192 A | 7/2000 | Kanevsky | |
| 6,101,472 A | 8/2000 | Giangarrea et al. | |
| 6,101,510 A * | 8/2000 | Stone et al. | 715/513 |
| 6,115,040 A * | 9/2000 | Bladow et al. | 345/741 |
| 6,115,737 A | 9/2000 | Ely | |
| 6,223,541 B1 | 5/2001 | Farrag | |
| 6,226,623 B1 | 5/2001 | Schein | |
| 6,233,541 B1 * | 5/2001 | Butts et al. | 703/27 |
| 6,311,178 B1 | 10/2001 | Bi | |
| 6,324,522 B2 | 11/2001 | Petersen et al. | |
| 6,341,271 B1 | 1/2002 | Salvo et al. | |
| 6,366,829 B1 | 4/2002 | Wallace et al. | |
| 6,389,337 B1 | 5/2002 | Kolls et al. | |
| 6,396,833 B1 * | 5/2002 | Zhang et al. | 370/392 |
| 6,445,774 B1 | 9/2002 | Kidder | |
| 6,473,407 B1 | 10/2002 | Ditmer | |
| 6,487,278 B1 | 11/2002 | Skladman | |
| 6,539,548 B1 | 3/2003 | Hendricks | |
| 6,578,005 B1 | 6/2003 | Lesaint et al. | |
| 6,587,822 B2 | 7/2003 | Brown | |
| 6,587,851 B1 | 7/2003 | Ditcharo | |
| 6,598,167 B2 * | 7/2003 | Devine et al. | 713/201 |
| 6,636,831 B1 * | 10/2003 | Profit et al. | 704/275 |
| 6,671,824 B1 | 12/2003 | Hyland | |
| 6,724,406 B1 * | 4/2004 | Kelley | 715/804 |
| 6,736,376 B1 * | 5/2004 | DeLisle | 261/79.1 |
| 6,738,815 B1 * | 5/2004 | Willis et al. | 709/225 |
| 6,763,376 B1 | 7/2004 | Devine | |
| 6,971,072 B1 | 11/2005 | Stein | |
| 7,111,243 B1 | 9/2006 | Ballard | |
| 2001/0016819 A1 | 8/2001 | Kolls | |
| 2002/0099642 A1 | 7/2002 | Schwankl | |
| 2002/0103906 A1 * | 8/2002 | Knight et al. | 709/225 |
| 2002/0138656 A1 | 9/2002 | Hickey | |
| 2003/0006913 A1 | 1/2003 | Joyce | |
| 2003/0008661 A1 | 1/2003 | Joyce | |
| 2003/0023601 A1 * | 1/2003 | Fortier et al | 707/10 |
| 2003/0046397 A1 * | 3/2003 | Trace et al. | 709/227 |
| 2003/0125956 A1 | 7/2003 | Lewis | |
| 2003/0139932 A1 | 7/2003 | Shao | |
| 2004/0014479 A1 | 1/2004 | Milman | |
| 2004/0209602 A1 | 10/2004 | Joyce | |

FOREIGN PATENT DOCUMENTS

| | | |
|---|---|---|
| EP | 0732850 | 9/1996 |
| JP | 2000112746 A | 4/2000 |

OTHER PUBLICATIONS

IBM Voice Systems (www-4.ibm.com/software/speech).
IBM Voice Systems (www-4.ibm.com/software/speech/enterprise).
IBM Voice Systems (www-4.ibm.com/software/speech/enterprise/ms_0.html).
Metroplex Voice Computing, Inc. (www.metroplexvoice.com).
Metroplex Voice Computing, Inc. (www.metroplexvoice.com/toc.htm).
Metroplex Voice Computing, Inc. (www.metroplexvoice.com/news.htm).
Metroplex Voice Computing, Inc. (www.metroplexvoice.com/products.htm).
Metroplex Voice Computing, Inc. (www.metroplexvoice.com/medical_speech_recognition.htm).
Voice Recognition Systems Home Page (www.iglou.com/vrsky/rightframe.htm).
Lernout & Hauspie (www.lhsl.com/default2.htm).
Lernout & Hauspie, "The Language of Business" (www.lhsl.com/business).
Lernout & Hauspie, "Voice Xpress" (www.lhsl.com/voicexpress).
TMA Associates (www.tmaa.com).
TMA Associates, Editor's Notes (May 2000) (www.tmaa.com/voice_web.htm).
Fonix (www.fonix.com).
Dragon Systems Inc.: Dragon Naturally Speaking Preferred Edition (www.zdnet.com/pcmag/features/speech/rev1.html.
Nuance Verifier 2.0 (www.nuancecom.com/products/verifier.html).
Nuance Vocalizer (www.nuancecom.com/products/vocalizer.html).
Nuance 7.0 (www.nuancecom.com/products/nuance7.html).
Nuance (www.nuancecom.com).
Nuance Powers the Voice Web (www.nuancecom.com/partners/voiceweb.html).
Nuance Product Offering (www.nuancecom.com/products/products.html).
Nuance Voyager (www.nuancecom.com/products/voyager.html).
Nuance Solutions (www.nuancecom.com/solutions/solutions.html).
Nuance Enterprise Solutions (www.nuancecom.com/solutions/enterprise.html).
Nuance Telecom Solutions (www.nuancecom.com/solutions/telecom.html).
Nuance Internet Solutions (www.nuancecom.com/solutions/internet.html).
Nuance Services (www.nuancecom.com/services/services.html).
Nuance Speech Application Design and Development (www.nuancecom.com/services/speech_application_design.html).
Delivering Speech Technologies with the Fonix FAAST® Framework, Part I (a white paper), Feb. 2001.
No author; FieldCentrix Selects BellSouth's Intelligent Wireless Network to Bring Wireless Data Solution to Field Service Companies, Aug. 24, 1999; BusinessWire; Dialog copy pp. 1-2.
Moran et al.; "Multimodal User Interfaces in the Open Agent Architecture", Proceedings of the 2nd International Conference on Intelligent User Interfaces, Aug. 1996.
Conversay "Speech Technology Solutions", White Paper C 2001.
"Return on Investment Model", web.archive.org webpage of Norand.com, Feb. 6 1998, pp. 1-5.
"Norand-Payback", web.archive.org webpage of Norand.com, Feb. 6, 1998, pp. 1-2.

"Norand-Products", web.archive.org webpage of Norand.com, Feb. 6, 1998, pp. 1-5.

"Norand-Case Study", web.archive.org webpage of Norand.com, Feb. 1998, pp. 1-3.

Haugen, Dyan L.; Hill, Arthur V; "Scheduling to Improve Field Service Quality", Summer 1999, Decision Sciences, 30, 3: ABI/INFORM Global, pp. 783-804.

Freedman, David H; "Case Study: Gas Attack", Aug. 25, 1997, Forbes ASAP Supplement, pp. 45-52, Dialog 01485548 01-36536.

McCarthy, Vince, "The Transformation of the Public Network", Mar. 20, 1995, Telephone, v228n12, pp. 88-100, Dialong 0100552196-54914.

Paz, Noemi M; Leigh, William; "Maintenance scheduling: Issues, results and research needs", 1994, International Journal of Operations & Production Management, v14n8, pp. 47-69, Dialog 00956565 96-05958.

Tseng, Paul C; Lewis, Malcom; "Best Practices and Design Tips", Apr. 1999, Contracting Business, v56, n4, p2s84(1), Dialog 06305741 54514903.

Jewett, Dale,; "Service Call", Jul. 21, 1997, Automotive News, p. 61, Dialog 05140584 47847132.

Southerland, Randy; "Not your typical garbagemon", Feb. 2000, Waste Age, 31, 2, ss50, Dialog 11970477 60110303.

"The Luxury Class Database", Apr. 3, 1995, InformationWeek, n 521, p. 100+, Dialong 00593604 23168942.

Ivey, Mike; "Cub: Toughen Penalties vs. Ameritech", Sep. 7, 2000, Madison Capital Times, Madison, Wisconsin, p. 1E, ProQuest ID 59714682.

Jaffe, Charles; "Gas Supplier takes timing seriously if delivers are late, the product is free", Feb. 5, 1989. The Morning Call, Allentown, PA, p.D.01, ProQuest ID 92485879.

Lister, Karen; "Improvements cited in Portland cable service", Jul. 21, 1995, Corpus Christi Caller Times, Corpus Christi, TX., Sec. B, p. 2, ProQuest 6892257.

"Norand-Field Service", web.archive.org webpage of Norand.com., Feb. 6, 1998, pp. 1-2.

"Norand-Training", web.archive.org webpage of Norand.com., Feb. 6, 1998, pp. 1-2.

Wood, Michael; "Fighting the paperwork nemesis", Mar. 1996, American Gas, v78n2, pp. 32-33, Dialog 01179245 98-28640.

"Powering better customer service. (Boston Edison implements mobile computing solution)", May 1997, Communication News, v34, 5n, p. 50(2) Dialog 02070908 19414033.

Kosseff, Jeffrey; "Service Delays May Lead to AT&T Fine", Jul. 18, 2001, The Oregonian, Portland, OR., p. C.01. ProQuest ID 75527844.

Commercial Speech Recognition (www.tiac.net/users/rwilcox/speech.html); Apr. 17, 2001.

IBM Voice Systems(www-4.ibm.com/software/speech); Apr. 17, 2001.

IBM Voice Systems (www-4.ibm.com/software/speech/enterprise); Apr. 17, 2001.

IBM Voice Systems (www-4.ibm.com/software/speech/enterprise/ms_0.html); Apr. 17, 2001.

Metroplex Voice Computing, Inc. (www.metroplexvoice.com); Apr. 17, 2001.

Metroplex Voice Computing, Inc. (www.metroplexvoice.com/toc.htm); Apr. 17, 2001.

Metroplex Voice Computing, Inc. (www.metroplexvoice.com/news.htm); Apr. 17, 2001.

Metroplex Voice Computing, Inc. (www.metroplexvoice.com/products.htm); Apr. 17, 2001.

Metroplex Voice Computing, Inc. (www.metroplexvoice.com/medical_speech_recognition.htm)); Apr. 17, 2001.

Voice Recognition Systems Home Page (www.iglou.com/vrsky/rightframe.htm); Apr. 17, 2001.

Lernout & Hauspie (www.lhsl.com/default2.htm); Apr. 17, 2001.

Lernout & Hauspie, "The Language of Business" (www.lhsl.com/business); Apr. 17, 2001.

Lernout & Hauspie, "Voice Xpress" (www.lhsl.com/voicexpress); Apr. 17, 2001.

TMA Associates (www.tmaa.com); Apr. 17, 2001.

TMA Associates, Editor's Notes (May 2000) (www.tmaa.com/voice_web.htm); Apr. 17, 2001.

Fonix (www.fonix.com); Apr. 17, 2001.

Dragon Systems Inc.: Dragon Naturally Speaking Preferred Edition (www.zdnet.com/pcmag/features/speech/rev1.html); Apr. 17, 2001.

Nuance Verifier 2.0 (www.nuancecom.com/products/verifier.html); Apr. 19, 2001.

Nuance Vocalizer (www.nuancecom.com/products/vocalizer.html); Apr. 19, 2001.

Nuance 7.0 (www.nuancecom.com/products/nuance7.html); Apr. 19, 2001.

Nuance (www.nuancecom.com); Apr. 19, 2001.

Nuance Powers the Voice Web (www.nuancecom.com/partners/voiceweb.html); Apr. 19, 2001.

Nuance Product Offering (www.nuancecom.com/products/products.html); Apr. 19, 2001.

Nuance Voyager (www.nuancecom.com/products/voyager.html); Apr. 19, 2001.

Nuance Solutions (www.nuancecom.com/solutions/solutions.html); Apr. 19, 2001.

Nuance Enterprises Solutions (www.nuancecom.com/solutions/enterprise.html); Apr. 19, 2001.

Nuance Telecom Solutions (www.nuancecom.com/solutions/telecom.html); Apr. 19, 2001.

Nuance Internet Solutions (www.nuancecom.com/solutions/internet.html); Apr. 19, 2001.

Nuance Services (www.nuancecom.com/services/services.html); Apr. 19, 2001.

Nuance Speech Application Design and Development (www.nuancecom.com/services,speech_application_design.html); Apr. 19, 2001.

Delivering Speech Technologies with the Fonix FAAST Framework, Part I (a white paper) Feb. 2001.

Derfler, Frank J et al, "How Networks Work", Millennium ed. , Que Corp. Jan. 2000.

White, Ron, "How Computers Work", Millennium ed., Que Corp. Sep. 1999.

Gralla, Preston, "How the Internet Works", Millennium ed., Que Corp., Aug. 1999.

* cited by examiner

TECHNICIAN INTRANET ACCESS VIA SYSTEMS INTERFACE TO LEGACY SYSTEMS

FIELD OF THE INVENTION

The present invention relates generally to the field of telecommunications dispatching and, more particularly, to methods and apparatus for providing mobile personnel access to a company shared network.

BACKGROUND OF THE INVENTION

Telecommunications technicians, such as so-called "Installation and Maintenance" (I&M) technicians, may visit customer sites to install new equipment, set up new services, or to service existing equipment or services. Frequently an I&M technician needs to gather local or district-specific information to complete a "job order" or task. For example, an I&M technician may need to know cross-box locations, pricing information, service information, cable records, plat information, or other information needed to carry out his or her assignment.

For many telephone companies, including Regional Bell Operating Companies (RBOCs), such local information is generally not stored on centralized legacy systems. Accordingly, although I&M technicians can presently access information stored on these central legacy systems using portable laptops and custom software, they are unable to remotely access the local information using their portable laptops.

According to the conventional approach to this problem, an I&M technician seeking local information must make one or more telephone calls to local offices of his or her employer. Several calls may be required. The I&M technician may be put on hold as the call attendant collects the information or tends to other business. The time the I&M technician must spend in collecting local information reduces his or her job efficiency and may increase costs to customers. Furthermore, miscommunications between individuals may cause incorrect information to be transferred. For example, the data retrieved by the call attendant may not be accurately interpreted by the call attendant who has a lower level of technical expertise than the I&M technician. These are significant drawbacks to the current approach.

SUMMARY OF THE INVENTION

The present invention is generally directed to a system and method for permitting a user to access an intranet using a computer that is already in communication with legacy systems.

Using an embodiment of the present invention, a user logs a computer into a systems interface which permits access to back-end legacy systems. Preferably, the systems interface is associated with at least a first network address. Preferably, the systems interface includes a first server with middleware for managing the protocol interface. Preferably, the systems interface includes a second server for receiving requests and generating legacy transactions. After the computer is logged in, a request for access to an intranet is made. Preferably, the request results from a technician selecting an icon or engaging a software button from within the currently running application. After the request is processed, one or more messages are sent from the systems interface to the computer. The messages cause the computer to launch a software application that seeks out a separate network address corresponding to the intranet. Preferably, the software application is a browser that seeks out a technician home page on the intranet. The systems interface routes communications from the computer to the separate network address. Preferably, the messages cause the first server to route the computer from the first network address to the separate network address.

The advantages of the present invention are numerous. The invention permits a technician to remotely access local or district-specific information without making a series of phone calls to local offices. The initial log-in to the systems interface provides a measure of security, yet a separate log-in to the intranet is not required. When accessing the intranet, the computer remains logged in to the systems interface so that a return to the systems interface, for example, to access the legacy systems, is readily achieved. Other benefits and advantages exist.

DETAILED DESCRIPTION OF THE INVENTION

Figure 1:
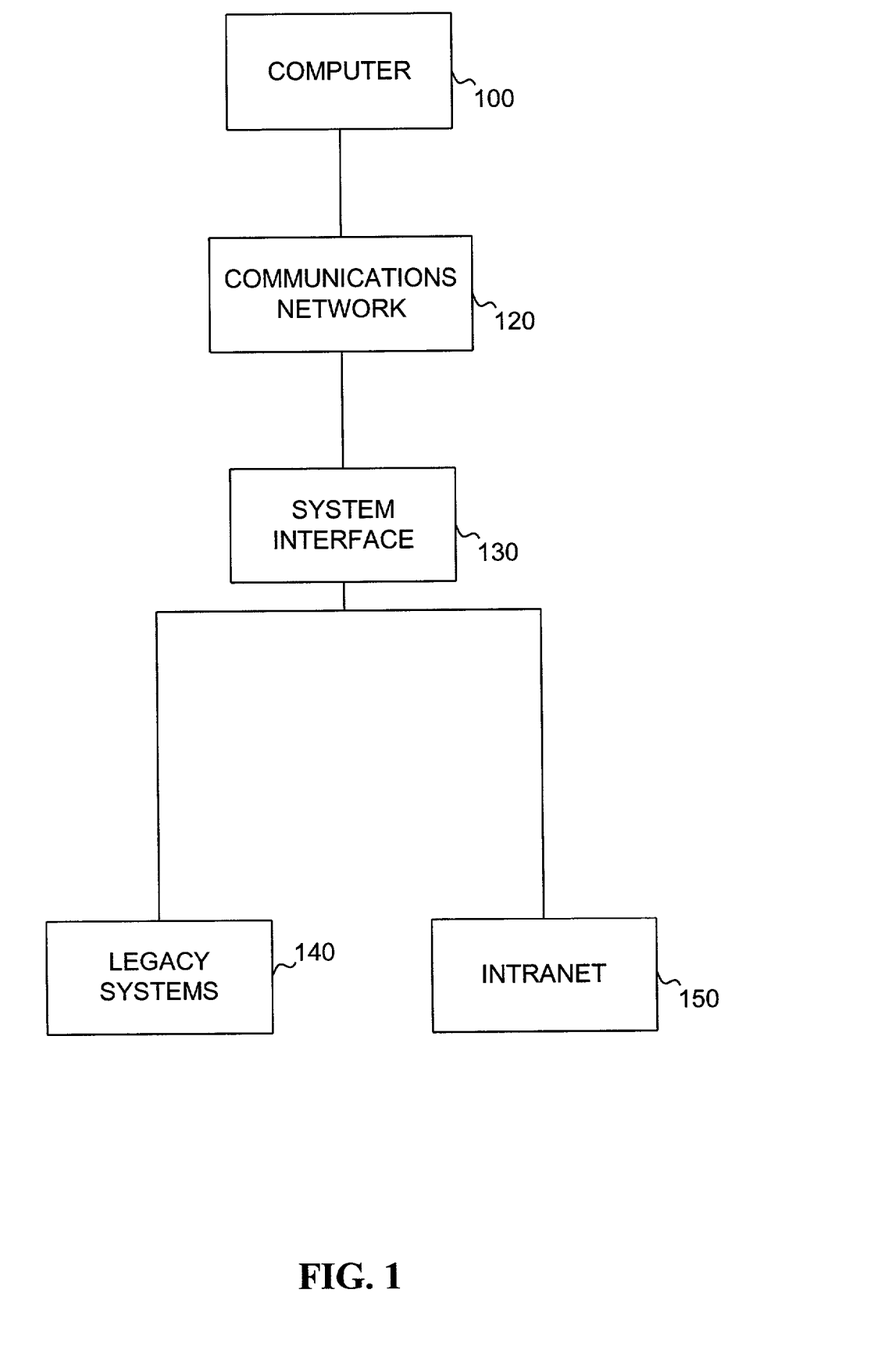
FIG. 1 is a schematic block diagram of a system for allowing user access to an intranet according to one embodiment of the invention.

FIG. 1 is a schematic block diagram of an exemplary system for allowing a user, such as a technician, to access an intranet according to one embodiment of the invention. The system of FIG. 1 includes computer 100, communications network 120, systems interface 130, back-end legacy systems 140, and intranet 150.

Computer 100 is a computer used by a technician or other service person to access information from back-end legacy systems 140. As used herein, "computer" is used in the broadest sense of the term. A "computer" may be a microcomputer, minicomputer, laptop, personal data assistant, cellular phone, two-way pager, processor, or any computerized device capable of transmitting and receiving data over a shared network. Preferably, computer 100 is a ruggedized laptop computer.

Computer 100 remotely accesses systems interface 130 through communications network 120. Communications network 120 may be any communications network that permits a remote computer to access a remote server. Communications network 120 could be a wireline network, wireless or cellular network, satellite network, and so forth. Preferably, communications network 120 is a Public Switched Telephone Network (PSTN).

Systems interface 130 provides a systems interface between remote (and preferably portable) computers 100 seeking data from back-end legacy systems 140. Legacy systems 140 are generally mainframe-type computer systems that maintain data for a company. In one exemplary example, legacy systems 140 may include one or more legacy systems including a loop facility assignment control system, a loop maintenance operations system, a computer system for main frame operations, a mechanized loop testing system, a secure network element contract server, a mechanized time reporting system, and a work activity statistical sampling plan system. In one specific implementation of the present invention, for example, legacy systems 140 can include one or more of the following systems: Loop Facility Assignment Control System; Loop Maintenance Operations System; Computer System for Main Frame Operations; Mechanized Loop Testing; Secure Network Element Contract Server; Mechanized Time Reporting; and Work Activity Statistical Sampling Plan.

Intranet 150 is a company shared network that includes local information not generally stored or maintained on legacy systems 140. Generally, intranet 150 includes firewalls or similar protections to prevent tampering or intrusion by unauthorized users. Prior to the present invention, intranet 150 was generally inaccessible to technicians operating a computer 100 that is logged-in to the systems interface 130 to legacy systems 140. As used herein, "company" is intended to have the broadest meaning, and should be understood to include a company, corporation, association, partnership, limited liability company, and any other group of persons or entities that may store and share data via a shared intranet. Preferably, intranet 150 is an intranet for a telecommunications entity that stores local or district-specific information not generally stored in centralized back-end legacy systems. According to another embodiment, intranet 150 may be or may include an external computer network, for example, the Internet.

The general operation of the system of FIG. 1 is as follows. A technician with computer 100 logs-in to systems interface 130 over communications network 120. After the log-in, systems interface 130 permits computer 100 to submit requests for information. Systems interface 130 processes these requests, generates legacy transactions, receives information from legacy systems 140, and transmits the information back to computer 100. Systems interface 130 is also adapted to process a user request to access intranet 150. If the user request is granted, computer 100 is routed from systems interface 130 to intranet 150.

Figure 2:
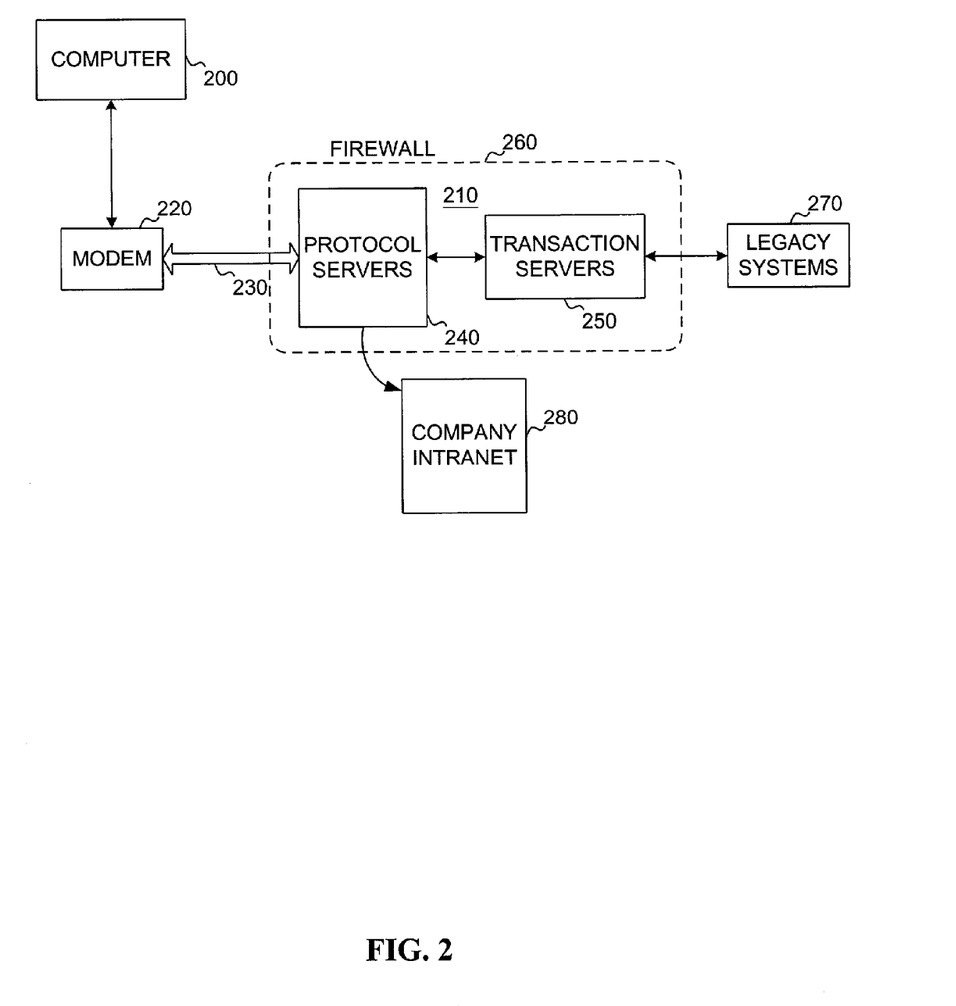
FIG. 2 is a schematic block diagram of a system for allowing user access to an intranet according to another embodiment of the invention.

FIG. 2 is a schematic block diagram of an exemplary preferred system for allowing technicians to access an intranet according to another embodiment of the invention. The system of FIG. 2 includes computer 200, modem 220, communications network 230, one or more protocol servers 240, one or more transaction servers 250, firewall 260, legacy systems 270, and company intranet 280.

Computer 200 is a remote and preferably portable computer (e.g., a laptop or notebook computer) used by a technician. Computer 200 may be any of the devices discussed above for computer 100 (FIG. 1). Modem 220 is a modem for coding and decoding data transmitted between computer 200 and communications network 230. Communications network 230 can be a wireline communications network. For example, communications network 230 can be a PSTN, such as the BellSouth Communications Network. According to an embodiment, modem 220 and communications network 230 can support transmission rates in the range of about 9.6-56 kilobits per second.

Legacy systems 270 and company intranet 280 are similar to and include any of the variations discussed in connection with legacy systems 140 and intranet 150, respectively, of FIG. 1.

According to FIG. 2, computer 200 accesses one or both legacy systems 270 and company intranet 280 via systems interface 210. System interface 210 can include protocol servers 240 and transaction servers 250. System interface 210 can be protected by firewall 260.

Generally, protocol servers 240 provide a protocol and middleware interface between computer 200 and transaction servers 250. Protocol servers 240 may receive requests for information or other messages from computer 200; route requests or messages to input queues in transaction servers 250; receive responsive information from transaction servers 250; and route responsive information back to computer 200.

Generally, transaction servers 250 provide an interface to back-end legacy systems 270 so that responsive information can be retrieved. Transaction servers 250 may service requests, generate legacy transactions in response to those requests, and receive responsive information to be forwarded back to protocol servers 240.

In one specific implementation, protocol servers 240 may be NT servers running NetTech software from Broadbeam Corporation of Princeton, N.J. Transaction servers 250 may utilize Unix operating system software running an Informix database management system.

The preferred systems interface 210 (element 130 of FIG. 1 and elements 240, 250 and 260 of FIG. 2) is disclosed in the copending, commonly owned, U.S. patent application Ser. No. 09/343,815, entitled "Systems and Methods for Utilizing a Communications Network for Providing Mobile Users Access to Legacy Systems (hereinafter, referred to as "the '815 application"), filed on Jun. 30, 1999, the entirety of which is hereby incorporated by reference. The preferred systems interface is described in the aforementioned application in connection with the "TECHNET" system, which includes protocol servers and TechNet servers corresponding to protocol servers 240 and transaction servers 250, respectively.

According to an embodiment, the "virtual location" (hereinafter, simply the "location") of the systems interface comprised of protocol servers 240 and transaction servers 250 is defined by at least one network address. Preferably, the network address comprises an Internet Protocol (IP) address, which is well-known in the art. At least a first network address defines the location of the systems interface. Preferably, the location of the protocol server 240 is defined by a first network address and the location of the transaction server 250 is defined by a second network address.

The company intranet 280 has its own separate network address or addresses. Preferably, the network address defining the company intranet 280 is an IP address. The network address of company intranet 280 is referred to herein as a "separate network address" so as to indicate that company intranet 280 is located at a network address separate from the network address or addresses of the systems interface.

The general operation of the preferred system of FIG. 2 is now described. A user (e.g., a technician) using computer 200 dials up or otherwise contacts protocol servers 240 via modem 220 and communications network 230. The technician may log-in to the protocol servers 240 using a number of methods. For example, a user name and other data, such as a password or primary host group address may be used in the log-in process. Once the technician has been authenticated, a session (hereinafter, a "TechNet session") is established and computer 200 is connected to a protocol server 240 at a first network address. Preferably, computer 200 is running application-specific client software for interfacing with the systems interface to legacy systems 270. According to an embodiment, computer 200 is running the TechNet client application disclosed in the '815 application.

Preferably, upon log-in a primary screen or primary graphical user interface (GUI) is transmitted to computer 200. This is referred to herein as the "TechNet home page." A technician may make selections from the TechNet home page to access data from back-end legacy systems 270. For example, the technician may select "Get A Job" to get his or her next task or job order. The technician's selection of an icon or software button for "Get A Job" results in the client application generating a request that is transmitted to protocol server 240. The information corresponding to the request (i.e., a job order for that technician) is provided from legacy systems 270. Other requests for information from legacy systems 270 can be initiated by the technician using the TechNet home page.

The TechNet home page also includes an icon or software button that can be selected or engaged in order to access company intranet 280. When the technician selects the button or icon, a request for intranet access is generated by the client application and is forwarded to transaction server 250 via protocol server 240. Transaction server 250 processes the request to determine whether access to intranet 280 shall be granted. For example, transaction server 250 may confirm that the technician is a valid user who is properly logged in to a TechNet session. Transaction server 250 may compare the technician's user ID to a list of authorized (or prohibited) technician intranet users to determine if access to intranet 280 should be granted (or denied). According to an embodiment, a separate password might be required for access to intranet 280.

If the request for intranet access is granted, transaction server 250 sends one or more commands to initiate intranet access. Preferably, the command takes the form of an Application Program Interface (API) command. The command is transmitted by protocol server 240 to computer 200, where it causes computer 200 to launch a software application that seeks out the separate network address corresponding to intranet 280. Preferably, the software application is a browser. Preferably, the separate network address corresponds to a so-called "Technician Intranet Access Home Page."

The command issued by transaction server 250 also direct protocol server 240 to route communications from computer 200 from the first network address for protocol server 240 to the separate network address for intranet 280. This routing permits computer 200 to leave the zone defined by firewall 260 for the systems interface and enter the zone defined by a firewall (now shown) for the intranet 280.

At this point, the technician using computer 200 has access to local information on intranet 280. The aforementioned client application (e.g., the TechNet client application) is still active and the user is still logged-in to the systems interface (e.g., TechNet system). Preferably, the client application is minimized or its window is hidden behind the browser window. For example, the TechNet home page may be hidden behind the Technician Intranet Access Home Page. Preferably, the user can toggle between the two applications (or windows) because both are active. The technician can return to the systems interface (e.g., TechNet) by closing the browser or simply toggling between the two applications.

For example, intranet 280 may be a telephone company's intranet serving various local offices of the telephone company. In this example, the technician can access district-specific information such as cross-box locations, pricing information, service information, cable records, plat information, or other local information.

Figure 3:
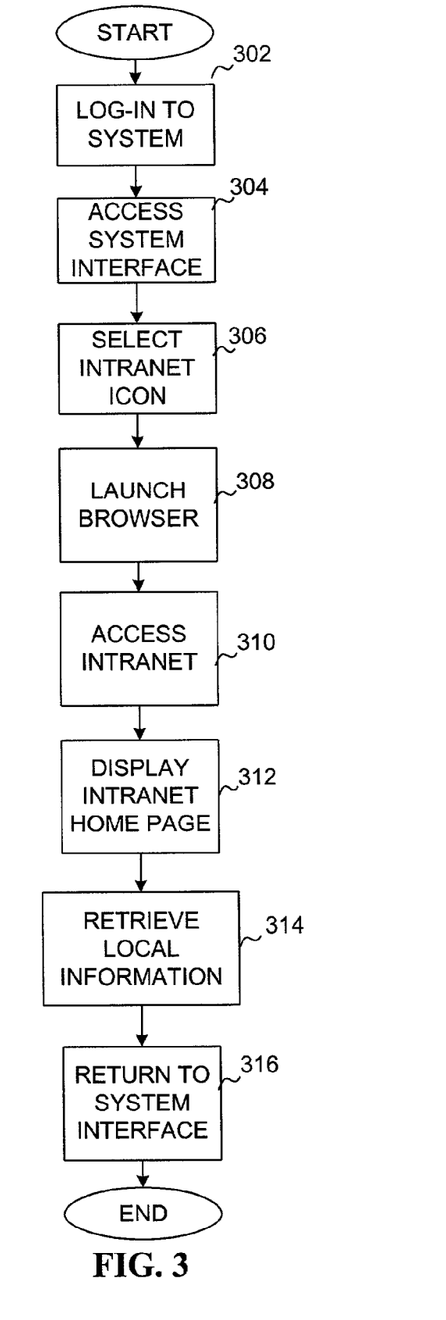
FIG. 3 is a flow diagram of a method for a user to access an intranet according to one embodiment of the invention.

FIG. 3 is an exemplary flow diagram of a method for a user (e.g., a technician) to access an intranet according to an embodiment of the invention. FIG. 3 is explained below in connection with certain structure from the exemplary systems of FIG. 1 and FIG. 2. However, it should be understood that this done only to explain and illustrate the method in a clear manner.

The present invention is not limited or constrained by the structure of FIG. 1 or FIG. 2 or by any other structure.

In FIG. 3, a user, such as a technician, logs-in to the system (e.g., the TechNet system) in step 302. For example, a technician may log-in to a protocol server 240 of FIG. 2 by entering a user ID.

In step 304, the technician's computer (e.g., computer 200 of FIG. 2) is accessing the systems interface (e.g., element 130 of FIG. 1 or elements 240 and 250 of FIG. 2) to back-end legacy systems (e.g., element 140 of FIG. 1 or element 270 of FIG. 2). According to an embodiment, the systems interface is accessed at a first network address, preferably corresponding to a protocol server 240 (FIG. 2). The network address is preferably an IP address.

In step 306, the user selects or engages an intranet icon or software button to access an intranet.

In step 308, a software application such as a browser is launched at the user's computer (e.g. computer 200 of FIG. 2).

In step 310, the user's computer accesses the intranet. In one embodiment, the user's computer is accesses the intranet at a separate network address that is distinct from the aforementioned first network address. The separate network address is also preferably an IP address.

In step 312, an intranet home page is displayed. For example, a technician's computer 200 (FIG. 2) may display a Technician Intranet Home Page, previously discussed.

In step 314, the desired local information on the intranet (e.g., intranet 280 of FIG. 2) is retrieved. In one embodiment, a technician retrieves district-specific information such as cross-box locations, pricing information, service information, cable records, and plat information.

In step 316, the user returns to the systems interface to the legacy systems. For example, the user may toggle back to the TechNet client application or the user may close the browser application.

Figure 4:
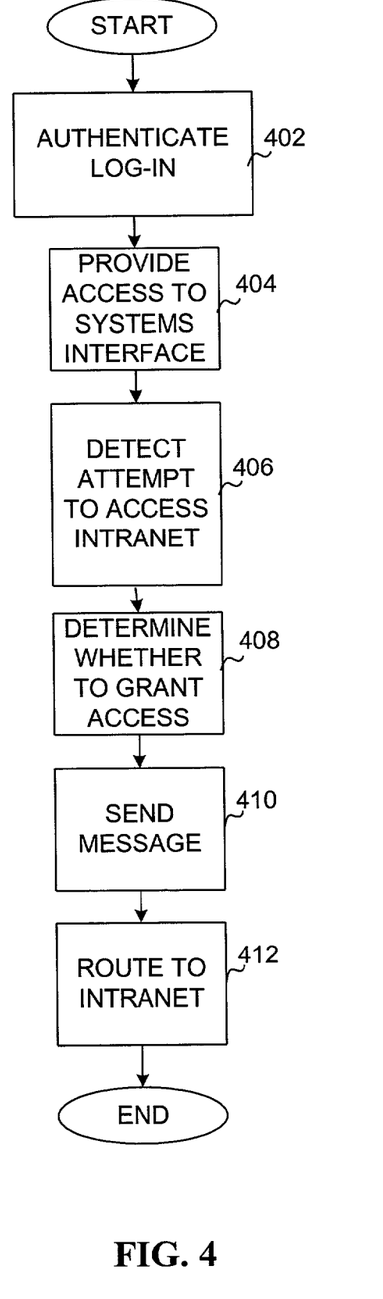
FIG. 4 is a flow diagram of a method for allowing a user to access an intranet according to another embodiment of the invention.

FIG. 4 is an exemplary flow diagram of a method for a allowing a user (e.g., a technician) to access an intranet according to another embodiment of the invention. FIG. 4 is explained below in connection with certain structure from the exemplary systems of FIG. 1 and FIG. 2. However, it should be understood that this done to clearly explain the method. The method of FIG. 4 is not limited or constrained by the structure of FIG. 1 or FIG. 2 or by any other structure.

In step 402, a log-in attempt by a user is authenticated. For example, a protocol server 240 (FIG. 2) may authenticate a technician attempting a log-in using computer 200 (FIG. 2).

In step 404, access to a systems interface to back-end legacy systems is provided. For example, computer 200 may be accessing protocol server 240 (FIG. 2) at a first network address.

In step 406, a request for intranet access is received. For example, transaction server 250 (FIG. 2) may receive a request for intranet access from computer 200 (FIG. 2) via protocol server 240 (FIG. 2).

In step 408, the request is processed. For example, transaction server 250 (FIG. 2) may determine whether a technician is logged-in to the TechNet system and/or whether that technician is permitted access to intranet 280 (FIG. 2).

In step 410, a message is sent to the client regarding the request for intranet access. For example, the message may be an API command initiated by the transaction server 250 (FIG. 2) that causes computer 200 (FIG. 2) to launch a browser which seeks a predetermined intranet network address.

In step 412, the client is routed to the intranet. For example, communications from computer 200 (FIG. 2) may be routed from the first network address corresponding to the protocol server 240 (FIG. 2) to a separate IP address corresponding to intranet 280 (FIG. 2). Preferably, the separate network address corresponds to a Technician Intranet home page, discussed above. In preferred embodiments, the network addresses are IP addresses.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer-readable medium having instructions for performing acts comprising:

authenticating a computer attempting to log onto a systems interface to legacy systems;

providing access to the systems interface, the systems interface corresponding to at least one network address and including a protocol server that manages protocol with the computer and a transaction server in direct communication with the legacy systems;

sending a GUI to the computer, wherein the GUI provides a user of the computer an option to request access to an intranet that is distinct from the legacy systems;

receiving and processing at the systems interface the request for access to the intranet;

sending a message to the computer, the message causing the computer to launch a software application that seeks out a separate network address on the intranet; and directing communications from the computer from the systems interface to the separate network address by the protocol server bypassing the transaction server by directing the communications from the computer directly to the intranet; and communicating with both the at least one network address and the separate network address such that communication with the legacy systems and the intranet is maintained concurrently.

2. The computer-readable medium of claim 1, wherein the option to exercise the request is based on user selection of an icon or a software button.

3. The computer-readable medium of claim 1, wherein the message comprises an application program interface command and wherein the software application is a browser.

4. The computer-readable medium of claim 1 wherein a legacy system is at least one of a loop facility assignment control system, a computer system for main frame operations, a mechanized time reporting system and a work activity statistical sampling system.

5. A system for permitting a user to access data by employing a computer to access information from legacy systems, wherein the computer is running application-specific client software to access the information from legacy systems, the system comprising:

a systems interface to the legacy systems, the systems interface including a protocol server and a transaction server, the protocol server having a first network address and the transaction server having a separate network address, wherein the protocol server transmits a GUI to the computer over a network and which displays a first window incorporating one of an icon and a software button that can be engaged to initiate a request for access to an intranet;

wherein the transaction server issues at least one message over the network in response to the request, the at least one message causing the computer to launch a browser application as a second window and the at least one message causing communications from the computer to be directed from the first network address to a third network address corresponding to the intranet that is distinct from the legacy systems by the protocol server bypassing the transaction server and directing the communications from the computer directly to the intranet, wherein communication with both the first network address and the third network address is maintained concurrently.

6. The system of claim 5, wherein a legacy system is at least one of a loop facility assignment control system, a computer system for main frame operations, a mechanized time reporting system and a work activity statistical sampling system.

* * * * *